Jan. 16, 1968     H. B. WHITMORE     3,363,621
AUTOMATIC BLOOD PRESSURE MEASURING APPARATUS
Filed March 1, 1965

INVENTOR.
HENRY B. WHITMORE
BY Harry A. Herbert Jr.
Arsen Tashjian
ATTORNEYS 3,363,621
AUTOMATIC BLOOD PRESSURE
MEASURING APPARATUS
Henry B. Whitmore, Rte. 5, Box 369,
San Antonio, Tex. 78211
Filed Mar. 1, 1965, Ser. No. 436,391
6 Claims. (Cl. 128—2.05)

ABSTRACT OF THE DISCLOSURE

Blood pressure measuring apparatus having mechanical means for automatically controlling the pressure in a blood pressure cuff. The mechanical means includes a housing having a first chamber therein separated by a diaphragm from a second chamber in a cover portion. A valve arrangement in the first chamber operates to control the flow of air to the blood pressure cuff. External pressure variations are communicated to the second chamber and act on the diaphragm to compensate the system therefor and provide accurate blood pressure readings regardless of ambient pressure conditions.

---

The invention described herein may be manufactured and used by or for the United States Government for governmental purposes without payment to me of any royalty thereon.

This invention relates to apparatus for automatically measuring the blood pressure at predetermined intervals and is more particularly concerned with providing a device which automatically inflates a blood pressure cuff at programmed intervals allowing the inflation to build up to the desired pressure and then automatically releasing at the proper bleed-down rate.

The principles of sphygmomanometry, as presently known, generally include an inflatable arm cuff in conjunction with a microphone and pressure measuring device. The cuff is wrapped around the patient's limb and inflated until the air pressure in the cuff reduces the arterial circulation in the body member to a point at which the patient's pulse is no longer audible in the microphone or stethoscope. By allowing the air pressure in the cuff to be slowly reduced, the pulse sounds again become audible. The cuff air pressure at which this takes place may be considered to be the systolic pressure. The cuff is then further deflated until complete arterial circulation is restored at which point pulse sounds are no longer audible. This lower cuff pressure point is considered to be a reasonable accurate indication of the diastolic pressure.

It can be seen from the above description of a manual system for determining blood pressure that a number of routine steps are required. This can result in a tedious operation if it becomes necessary to determine blood pressures at relatively close intervals over a long period of time. Also, where the patient or research subject is involved in activity, it is difficult for the blood pressure to be accurately determined clinically by hand. Possibility of error is greater in manual blood pressure determinations, especially if a large number of readings are required.

Accordingly, it is an object of the present invention to provide apparatus which can be used to automatically inflate a blood pressure cuff to the proper pressure and release the pressure at a controlled bleed-down rate.

Another object of the invention is to provide a device which can be programmed to operate at any desired pressure and frequency with minimal mechanical parts.

Still another object of the invention is to provide apparatus which includes a compensating diaphragm permitting accurate blood pressure readings to be made at varying altitudes and, also, where subject is enclosed in a pressurized suit.

A further object of the invention is to provide a device to automatically apply cuff pressures at periodic intervals, while at the same time being simple to operate and maintain.

A still further object of the invention is to provide apparatus for blood pressure determination which is economical to manufacture and, yet, completely reliable in operation.

These and other objects, features, and advantages will become more aparent after considering the following detailed description taken in conjunction with the annexed drawings and appended claims.

In the drawings wherein like reference characters refer to like parts in the views.

Figure 1:
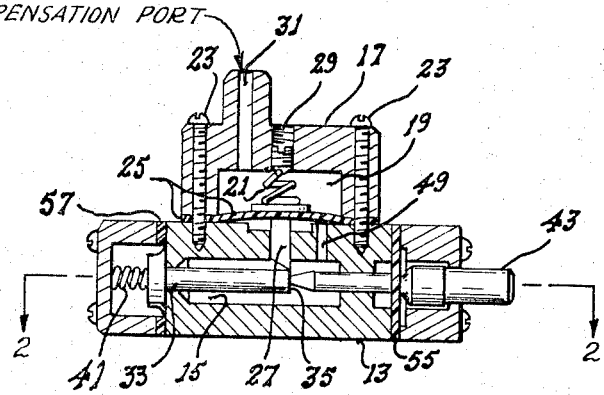
FIG. 1 is a cross-sectional view in side elevation of one embodiment of the invention.
Figure 2:
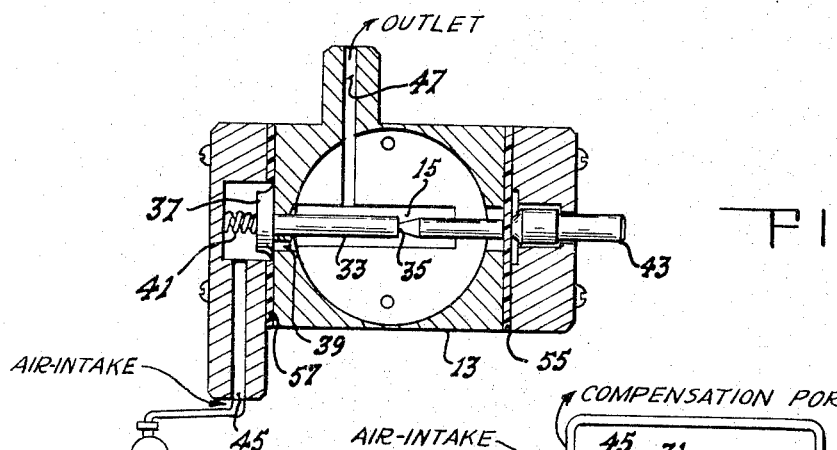
FIG. 2 is a top view in section of the invention taken along the line 2—2 of FIG. 1.
Figure 3:
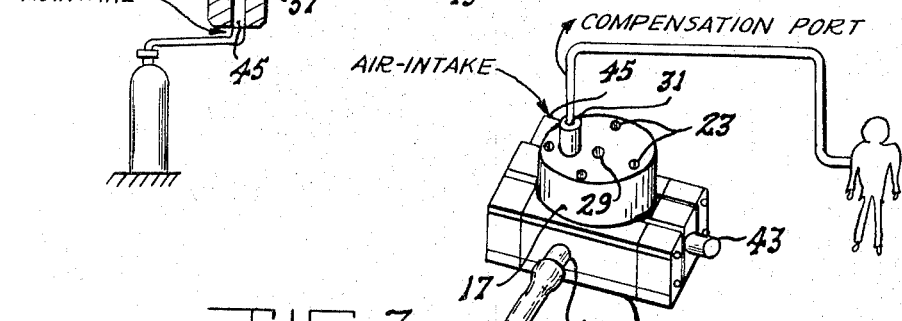
FIG. 3 is a general view in perspective of the invention assembled for operation in an automatic blood pressure measuring system.

Referring now to the drawings, the apparatus according to the invention includes a housing 13 having a chamber 15 in the central section thereof. A cover portion 17 is affixed to the top of the housing 13 and includes a chamber 19 which encloses a diaphragm spring 21. Holddown screws 23 serve to retain the cover portion 17 in position on the housing 13. A diaphragm 25 is disposed in the lower section of the chamber 19 and is held in place by the cover portion 17. The diaphragm spring 21 urges the diaphragm 25 along with an integrally attached catch member 27 downward toward the housing 13. A pressure adjust screw 29 passes through the cover portion 17 and contacts the upper end of the diaphragm spring 21 permitting the biasing pressure against the diaphragm 25 to be pre-set according to the desired level of cuff pressure. A compensation port 31 is in communication with the chamber 19 and the upper surface of diaphragm 25. The port 31 may be connected to a pressure suit in which the subject may be enclosed in order to compensate for pressure changes on the subject which are transmitted to diaphragm 25 or to sense the outside atmospheric pressure and to correct the cuff pressure accordingly by changing the release threshold.

In the chamber 15 in the housing 13 there is located a valve stem 33 having a groove 35 notched therein for receiving the lower end of catch member 27. A valve head 37 is attached to one end of valve stem 33 and serves to cover valve port 39 which is in communication with chamber 15. A valve spring 41 holds the valve head 37 over the valve port 39 until a valve actuator 43 is mechanically activated urging the valve stem 33 to begin a lateral motion overcoming the force of valve spring 41 and uncovering valve port 39 by moving the valve head 37 out of position. This allows air under pressure from a pressure source entering air intake 45 to pass through valve port 39 and into chamber 15. Blood pressure cuff line outlet 47 which is also in communication with chamber 15 receives the pressurized air and conducts it toward the blood pressure cuff. A diaphragm compensate 49 connects the lower surface of diaphragm 25 to the chamber 15 to allow the control pressure to act upon the diaphragm 25. An adjustable air bleed 51 is located in the line 53 which feeds the blood pressure cuff and operates to control the bleed-down rate for releasing the cuff pressure. Gaskets 53 and 55 serve to seal the chamber 15 and prevent loss of pressure therefrom.

In operation, the automatic blood pressure measuring apparatus according to the invention is utilized by connecting the air intake 45 to a pressurized air source preferably at around 12 lbs. per square inch pressure. The blood pressure line 53 with the air bleed 51 in place connects the cuff line outlet 47 to the blood pressure cuff. The apparatus is activated by depressing valve actuator 43 causing valve head 37 to unseat against the pressure of valve spring 41 and thereby uncover valve port 39. The valve actuator 43 can be programmed to operate in some appropriate time sequence depending on the desired frequency of blood pressure readings. As the valve head 37 unseats, the valve stem 33 moves laterally such that the groove 35 becomes positioned under catch member 27. The catch member 27, which normally rests against the surface of valve stem 33, is now forced downward into the groove 35 by the pressure of diaphragm spring 21. Diaphragm 25, which is attached to the catch member 27, also moves downward as a result of pressure exerted by diaphragm spring 21.

The engagement of catch member 27 with groove 35 in valve stem 33 operates to hold valve head 37 in open position allowing pressurized air to enter air intake 45, pass through valve port 39, and into chamber 15. Cuff line outlet 47 which is in communication with chamber 15 receives the pressurized air and directs it into cuff line 53 through which it flows to the blood pressure cuff. Air flow continues until the pressure in the cuff reduces arterial circulation in the body member to which it is attached. This same pressure is also exerted through the diaphragm compensate 49 to the lower surface of the diaphragm 25 urging it upward against the force of diaphragm spring 21 which is adjustable by means of pressure adjust screw 29. When the diaphragm 25 moves upward a sufficient amount overcoming the force of diaphragm spring 21, the catch member 27, which is attached to the diaphragm 25, disengages the grooves 35 in valve stem 33 allowing the valve spring 41 to move the valve head 37 laterally back into position over the valve port 39 stopping the air flow into chamber 15.

Air bleed 51 in the cuff line 53 gradually releases the pressure in the cuff at a pre-adjusted desired rate of bleed down. This procedure lowers the pressure on the lower surface of the diaphragm 25 causing the diaphragm spring 21 to again force the catch member 27 against the side of valve stem 33 so that mechanical depression of the valve actuator 43 will cause the apparatus to begin another pressurizing cycle and accomplish another blood pressure measurement. Any ambient pressure changes in the area of the blood pressure measuring apparatus caused by altitude variations will be compensated for by the action on the upper surface of the diaphragm 25 increasing or decreasing the pressure in the chamber 19 which is in communication with the outside atmosphere through compensation port 31. In the case where the subject is enclosed in a pressurized suit, the chamber 19 is pressurized at the same pressure as the suit and the cuff through compensation port 31, thereby eliminating the need for altitude adjustments and automatically compensating for pressure suit variations.

Additional apparatus not shown or described herein is used with this invention to form a completely automatic blood pressure measuring and recording system. This associated apparatus may include a pressure transducer, a miniaturized microphone, a source of gas pressure for inflation of the cuff and a recording device compatible with the pressure transducers. Since this last-named apparatus and its use in electronic measuring systems is well known, it does not form a part of my invention.

Although the invention has been illustrated and described in terms of a preferred embodiment thereof, it will be apparent to one skilled in the art that certain changes, alterations and modifications and substitutions can be made in the arrangement and location of the various elements without departing from the spirit and scope of the appended claims.

Having thus set forth and disclosed the nature of my invention, what I claim is:

1. An automatic blood pressure measuring apparatus comprising an occluding cuff for application over an artery in a limb of a living subject, means for periodically inflating and deflating said cuff, a source of pressurized air, a housing containing a chamber for receiving the pressurized air, said chamber having an intake and an outlet, said intake being connected to said pressurized air source and said outlet being connected to said occuluding cuff, normally closed valve means for controlling the flow of air into said chamber, actuator means for laterally displacing said valve means to open position, a catch member for engaging and holding said valve means in open position, a diaphragm attached to said catch member, said diaphragm being responsive to pressure changes in said chamber, biasing means for retaining said catch member in engaged position, increase in pressure in said chamber causing said diaphragm to overcome said biasing means and disengage said catch member from said valve means, said valve means returning to normally closed position stopping flow of pressurized air to said occluding cuff, and bleed down means in said outlet line releasing pressure in said occluding cuff and said chamber allowing said biasing means to urge said catch member into engagement with said valve means when said actuator means laterally displaces said valve means to open position.

2. The automatic blood pressure measuring apparatus defined in claim 1 wherein the normally closed valve means includes a valve head at one end thereof, valve biasing means for holding said valve head in closed position, an elongated stem portion having a groove near the center portion thereof, said groove being positioned to engage said catch member, and a valve port connecting said air intake with said chamber, said valve port being closed to the flow of pressurized air by said valve head when biased by said valve biasing means and open to the flow of pressurized air when laterally displaced by said actuator.

3. The automatic blood pressure measuring apparatus defined in claim 1 wherein the biasing means for retaining said catch member in engagement with said valve means includes a diaphragm spring for urging said diaphragm and attached catch member toward said valve means, and adjusting means for varying the pressure applied by said diaphragm spring on said diaphragm such that the maximum pressure reached in said chamber and said occluding cuff is proportional to the pressure of said diaphragm spring on said diaphragm.

4. An automatic blood pressure measuring apparatus comprising an occluding cuff for application over an artery in a limb of a living subject, means for periodically inflating and deflating said cuff, a source of pressurized air, a housing containing a first chamber for receiving the pressurized air, said first chamber having an intake and an outlet, said intake being connected to said pressurized air source and said outlet being connected to said occluding cuff, normally closed valve means for controlling the flow of air into said first chamber, actuator means for laterally displacing said valve means to open position, a second chamber disposed above said first chamber, a diaphragm separating said first and second chambers, a catch member integrally attached to said diaphragm and extending downward into said first chamber, said catch member being arranged to engage a groove in said valve means, biasing means for urging said diaphragm downward and for retaining said catch member in engaged position, said diaphragm being responsive to pressure changes in said first chamber such that an increase in pressure in said first chamber causes said diaphragm to overcome said biasing means and move upward into said second chamber disengaging the attached catch member from said valve means, said valve means returning to normally closed position stopping the flow of pressurized air to said occluding cuff, and bleed down means in said outlet line releasing pressure in said occluding cuff and said first chamber allowing said biasing means to urge said diaphragm and attached catch member downward into engagement with said valve means when said actuator means laterally displaces said valve means to open position.

5. The automatic blood pressure measuring apparatus defined in claim 4 wherein said second chamber includes a compensation port for allowing pressurized fluid from a pressurized suit worn by the living subject to contact the upper surface of said diaphragm, the pressure from said pressurized suit operating to add to the force of said biasing means to compensate for added pressure on the outside of the occluding cuff caused by pressure in the pressurized suit, thereby causing the pressure within the occluding cuff and first chamber to reach a higher pressure before said catch member releases said valve means.

6. The automatic blood pressure measuring apparatus defined in claim 4 including means for compensating for any pressure variations in the area of the occluding cuff, said compensating means including a compensation port in said second chamber open to the same atmospheric conditions as those in the area of the occluding cuff, said atmospheric conditions acting on the upper surface of said diaphragm to compensate for pressure changes on the lower surface of said diaphragm resulting from corresponding ambient pressures on said occluding cuff, thereby automatically controlling the proper pressure level at which said catch member releases said valve means.

References Cited

UNITED STATES PATENTS 3,252,459   5/1966   Hay _____ 128—2.05

RICHARD A. GAUDET, *Primary Examiner.*

SIMON BRODER, *Examiner.*